United States Patent
Heiberger et al.

[15] 3,670,056
[45] June 13, 1972

[54] POLYVINYL ALCOHOL FIBER REINFORCED POST-CHLORINATED POLYVINYL CHLORIDE RESINS

[72] Inventors: Charles A. Heiberger, Princeton; Henry O. Mottern, Far Hills, both of N.J.

[73] Assignee: Air Products and Chemicals, Inc., Allentown, Pa.

[22] Filed: Dec. 28, 1970

[21] Appl. No.: 102,205

[52] U.S. Cl. ............... 260/897 C, 260/23 XA, 260/28.5 D, 260/30.6 R, 260/31.8 M, 260/41 R, 260/41 A, 260/41 B, 260/41 C, 260/41 AG, 260/45.75 R, 260/45.75 K, 260/859 PV, 260/889, 260/891, 260/899
[51] Int. Cl. .................................... C08f 29/22, C08f 29/24
[58] Field of Search ....................... 260/897 C, 899, 41 C

[56] References Cited

UNITED STATES PATENTS 3,100,762  8/1963  Shockney .......................... 260/92.8
3,463,834  8/1969  Dreyfuss ........................... 260/899
3,488,406  1/1970  Sehm ................................ 260/899

FOREIGN PATENTS OR APPLICATIONS 1,125,986  9/1968  Great Britain

Primary Examiner—Murray Tillman
Assistant Examiner—J. Seibert
Attorney—Barry Moyerman and B. Max Klevitt

[57] ABSTRACT

Post-chlorinated vinyl chloride resins including homopolymers of vinyl chloride and copolymers thereof with an olefin such as propylene, having high impact strength together with an adequate melt flow rate are prepared by incorporating polyvinyl alcohol fibers into the resin. The polyvinyl alcohol fibers are completely hydrolyzed, about one-eighth to one-half inch in length, about 1 to 10 denier and have a degree of polymerization in the range of 500 to 3,000.

7 Claims, No Drawings

POLYVINYL ALCOHOL FIBER REINFORCED POST-CHLORINATED POLYVINYL CHLORIDE RESINS

This invention is concerned with improvement in the impact strength of post-chlorinated vinyl chloride resins including homopolymers thereof and interpolymers of vinyl chloride and olefins such as propylene. The impact strength of such post-chlorinated vinyl chloride resins is improved by the incorporation into the resin of polyvinyl alcohol fibers. The fibers are incorporated into the resin at a temperature below the temperature at which the fiber melts. The polyvinyl alcohol fibers reinforce the post-chlorinated vinyl chloride resin without reducing the heat deflection temperature of the resin and the reinforced resin maintains an adequate melt flow rate. The impact strength of the polyvinyl alcohol fiber reinforced resins does not decrease at low temperatures. Glass, asbestos, nylon, polyester, jute, and sisal fibers were all inferior to the polyvinyl alcohol fibers of this invention.

Vinyl chloride homopolymers are, in general, rigid materials characterized by substantial resistance to chemical attack, and they are used extensively in the chemical processing industry as well as in other manufacturing operations. However, vinyl chloride homopolymers are difficult to mold, and shaped objects formed from the polymer cannot be subjected to elevated temperatures in service since polyvinyl chloride has a relatively low heat deflection temperature (HDT), sometimes referred to as heat "distortion" temperature as measured by standard testing procedures, particularly Test Method D-648 of the American Society for Testing Materials (ASTM). It has, therefore, heretofore been proposed to copolymerize vinyl chloride with various materials and thereby produce copolymers particularly suitable for molding. Such copolymers are, for example, disclosed in U.S. Pat. No. 3,468,858 of Charles A. Heiberger and Leon Fishbein. In this patent various copolymers of vinyl chloride and olefins such as propylene are disclosed. To overcome the low heat deflection temperature characteristics of polyvinyl chloride and its various copolymers, it has also been proposed to post-chlorinate the polymers. The introduction of chlorine into the polyvinyl chloride molecule increases the HDT of the polyvinyl chloride. However, the introduction of chlorine into the homopolymer results in a hardening of the polymer, so that its "melt flow" rate as measured by standard test procedures such as ASTM D1238–57T, condition F, and its impact strength are reduced. As disclosed in copending U.S. patent application Ser. No. 846,417, filed July 31, 1969, polymers having the desired end-properties of post-chlorinated polyvinyl chloride including high HDT values and at the same time desirable and useful melt flow characteristics can be realized by certain post-chlorinated forms of vinyl chloride copolymers, such as copolymers with propylene. While these various approaches to the problem of obtaining a vinyl chloride resin with high heat deflection temperature and adequate melt flow rate have been attempted and are relatively successful, it will be appreciated that it is very difficult to obtain a polymer having the desired overall characteristics, particularly including high impact resistance.

In accordance with the present invention, however, it has been found that it is possible to take post-chlorinated vinyl chloride resins which have adequate melt flow rates and compound them with polyvinyl alcohol fibers, thereby substantially increasing the impact strength of the resin without adversely affecting the other properties of the resin. The common practice of adding large amounts of rubbery materials to improve impact resistance, for example, reduces the heat deflection temperature. Also, the increased impact resistance obtained by adding rubbery materials is lost at low temperature.

In accordance with this invention, fibers made from completely hydrolyzed polyvinyl alcohol are introduced into the post-chlorinated vinyl chloride resin, i.e., compounded with the post-chlorinated vinyl chloride resin at temperatures below those at which the fibers melt. Thereafter, the compounded resin can be used in conventional manners, as one would use the non-compounded vinyl chloride resin or vinyl chloride copolymer. The compounded resins are, for example, suitable for hot molding, extrusion, thermo-forming and other hot shaping operations to produce shaped objects having desirable physical properties including high impact strength and heat deflection temperatures.

The polyvinyl alcohol fiber used in the present invention is a completely hydrolyzed product of polyvinyl acetate, hereinafter referred to as PVOH fiber, and is preferably added to the vinyl chloride resin as chopped rovings or fibers about one-eighth to one-half inch in length and 1 to 10, preferably 4 to 8 denier. Any of the commercially available fibers made from completely hydrolyzed polyvinyl alcohol can be used. However, the PVOH used to produce the fibers generally has a degree of polymerization in the range of 500 to 3,000 preferably about 1,200 to 2,400. The amount of PVOH fibers to be used is that sufficient to provide about one to 30 parts by weight polyvinyl alcohol for each 100 parts by weight of the resin. About three to 15 parts PVOH fiber per 100 parts of resin (phr) is particularly suitable.

The fibers may be added to the vinyl chloride resin by any conventional means and the fibers may be softened in compounding, provided they are not melted. If, however, the fibers are added to the resin geometrically in layers or mats, rather than randomly, it is possible to use longer fibers than described above. For example, in a "lay-up" procedure it is possible to use a continuous fiber. In the "lay-up" procedure the resin is continuously extruded, for example, in the form of a cylinder, and the continuous fiber is introduced into the cylinder as it is being formed. In this procedure the amount of PVOH fibers is within the range set forth. When the polyvinyl alcohol fibers have been properly compounded, the final product is almost transparent and has a slightly frosty look in which the shape of fibers can still be seen. A particularly suitable method of incorporating the fibers into the resin is to separate the fibers and scatter them in the resin on a roll mill while the resin is molten. Compounding of the fibers into the resin is a physical mixing and it is desirable to have a uniform mix of the fibers within the resin.

As set forth above, the polyvinyl alcohol fibers can be used in formulation of reinforced thermoplastic resins using post-chlorinated polyvinyl chloride and post-chlorinated vinyl chloride copolymers with ethylene or propylene. The post-chlorinated polyvinyl chloride resins suitable for use with this invention have chlorine contents of 60 to 73 weight percent and specific gravities of from about 1.5 to 1.7. The intrinsic viscosities of the resin prior to post-chlorination are about 0.4 to 1.2 dl./g. While various vinyl chloride-olefin (ethylene or propylene) copolymers can be used in preparing the post-chlorinated resins suitably reinforced by this invention, particularly suitable and effective are the copolymers disclosed in U.S. Pat. No. 3,468,858. Such vinyl chloride copolymers are linear in structure with minimum branching with, for example, the propylene units randomly distributed among the vinyl chloride units in a polymer chain and are characterized by the presence of propylene-derived end-caps. While the copolymers of this patent are characterized by a propylene content of 1 to 10 percent, preferably 2 to 8 percent by weight, copolymers suitable for use in the present invention may contain up to about 25 percent by weight of the olefin such as propylene. The intrinsic viscosities of such copolymers prior to post-chlorination are in the range from about 0.4 dl./g. to 1.2, or 1.5 dl./g. and the melt flow rate of such copolymers is at least 0.1, generally 0.3 dg./min. or more, and is preferably at least 1 dg./min.

The utility of the PVOH fiber-reinforced post-chlorinated vinyl chloride resins lies in their application in the formation of shaped articles of high impact strengths by conventional forming operations under the application of heat, particularly shaped articles which are to be exposed in service to elevated temperatures, e.g., temperatures of 185° to 250° F, and even higher, e.g., up to about 300° F. When used to make such articles, the resins are suitably compounded in conventional manner, i.e., they may have added to them stabilizers and lubricants, and they may also be compounded with fillers, pigments, and resin additives to modify properties as desired. Conventional compounding agents of a type well known in the polymer art, and particularly in connection with vinyl resins, are suitably used. For example, suitable stabilizers include the well-known alkyl tin thioglycollate (Thermolite 31), di-octyl tin dilaurate, basic lead carbonate, metal phenates such as zinc, lead, or tin phenate, and barium n-nonyl phenate, fatty acid soaps of lead, cadmium, barium, calcium, magnesium and zinc, cadmium benzoate, triphenyl phosphite, mono-octyl diphenyl phosphite, di(epoxyethyl) benzene, epoxidized fatty oils, manganous pyrophosphate, and the like, alone or in combination. The function of various stabilizers in the vinyl polymers is well known and is described, for example, in "-Polymer Processes" by Schildknecht, pages 542,548. In general, any of the many stabilizers suitable for use with polyvinyl chloride may be employed.

In like manner, conventional lubricants, such as mineral oil, fatty acids, synthetic waxes of the fatty amide and ester types, octyl stearate and calcium stearate, are used. Polymer lubricants are referred to in Schildknecht, pp. 685 et seq. The stabilizers or inhibitors and lubricants are used in varying quantities, such as described in the foregoing publication, depending upon the nature of the individual agent. For example, stabilizers are generally used in the amount of 0.5 to 5 percent by weight of the reinforced vinyl chloride resin but the overriding criterion is the use of a small amount sufficient to effect the desired stabilization. The same considerations apply in the use of lubricants. In general, lubricants are used in amounts ranging from 0.1 to 1 percent or more by weight of the resin. In accordance with this invention, the PVOH fiber reinforced vinyl chloride resins are combined with 0.1 to 10 percent by weight of combined lubricant and stabilizer.

Any and all pigments commonly employed in coloring polyvinyl chloride compositions may be used, such as carbon black, titanium dioxide, phthalocyanines, and the like, depending upon the color, if any, desired in the final product.

While plasticizers are not ordinarily used in making rigid products, they can be used if desired. Any of the usual plasticizers for vinyl chloride resins may be used in the compositions of the present invention. These include, for example, dioctyl phthalate, dibutyl sebacate, tricresyl phosphate, and the like. The amount of plasticizers which can be used can vary depending on the rigidity and hardness desired.

In addition to the ingredients described, other resin additives, such as extenders, solvents, binders, and the like, may be present in the amounts ordinarily employed in the polyvinyl chloride art.

It is sometimes desirable to compound the PVOH fiber reinforced vinyl chloride resin compositions with other resinous materials which have a modifying effect upon the polymer resin. Examples of resinous materials suitable for this purpose include polyvinyl chloride, vinyl chloride-vinyl acetate copolymer and other vinyl chloride copolymers, chlorinated polyolefins, chlorinated polyvinyl chloride and other chlorinated vinyl chloride copolymers, acrylonitrile-butadiene-styrene polymers, acrylonitrile-butadiene copolymers, alkyl acrylate-methacrylate copolymers, such as polymers containing ethyl acrylate and methyl methacrylate, ethylene-alkyl acrylate copolymers, ethylene-vinyl acetate copolymers, and chlorinated paraffin waxes. Such modifying resinous materials can be used in various amounts but ordinarily in relatively minor proportions, e.g., less than 50 percent by weight of the PVOH fiber reinforced vinyl chloride resin, preferably 5 to 25 percent.

Intrinsic viscosity values dl./g., as used herein, are determined in conventional manner by extrapolation to infinite dilution of the reduced viscosity values at several concentrations of the polymer in cyclohexanone, as determined, for example, according to ASTM, D1243–60, Method A, but at 25° C. Weight percent propylene in the copolymers prior to post-chlorination is determined from chlorine analysis and correlated with volume percent propylene as determined by measurements of specific gravity (ASTM D792–60T) on a standard molded composition containing 3 parts by weight of an organic tin mercaptide stabilizer (Advastab T–360) per 100 parts by weight of copolymer. Melt flow rate (MFR) of the vinyl chloride copolymers from which the post-chlorinated polymers of this invention are made is determined by means of ASTM D1238–57T, condition F, for the copolymer in the above standard molded composition. The melt flow rate of the post-chlorinated products is determined by the same ASTM D1238–57T method, condition F, on a standard molding composition containing 4 parts by weight of Thermolite–32 (a tin maleate), and 1.5 parts calcium stearate per 100 parts post-chlorinated polymer. The Izod impact strength is determined according to ASTM D–256, Method A, on the aforementioned standard molding composition. The apparent modulus of elasticity is determined by means of ASTM D1043–61T and the results are expressed as $T_f$ in °C., which is the temperature corresponding to 135,000 p.s.i. apparent modulus of elasticity. $T_4$ is the temperature at 10,000 p.s.i. As is known, the $T_f$ value which is expressed in terms of apparent modulus of elasticity, as mentioned, corresponds approximately to the heat distortion temperature.

While the invention has been described above in its broader terms, it will be more fully understood by reference to the following examples for practical application. In the examples, all parts are by weight unless otherwise indicated.

The equipment for incorporating the PVOH fibers into resins was a steam heated two-roll mill. Resins were fluxed on the mill and the desired weight of the fiber scattered on the molten resin. The mill was opened after fluxing until only a small bead of plastic showed between the rolls. In this way, the

TABLE I

| Resin | Cl content | Propylene content | Intrinsic viscosity* | Izod impact, f.p.i. | $T_f$, °C. | $T_4$, °C. | HDT, °C. | MFR, g./10 min. | Sp. gr. |
|---|---|---|---|---|---|---|---|---|---|
| 1 | 66.2 | 6 | .64 | .3 | 97.0 | 110.6 | 95 | 2.1 | 1.543 |
| 2 | 67.5 | 3 | .75 | .3 | 105.0 | 121.0 | 102.5 | 0.2 | 1.575 |
| 3 | 67.4 | 8 | .51 | .1 | | | 102.7 | 3.7 | 1.567 |
| 4 | 65.7 | 8 | .51 | .1 | 102.0 | 115.7 | 98.5 | 4.2 | 1.552 |

*Prior to post-chlorination.

rolls acted as nearly like a calendar roll as possible. When all fibers had been added, the roll was closed to the desired sheet thickness (about one-sixteenth inch) and cut off as quickly as possible. Distribution of fibers in the resin was uniform. Analysis of a sample of the milled sheet by extraction of the resin from the fiber was made to check distribution. Resins mixed with polyvinyl alcohol fiber to contain 13 weight percent fiber analyzed at 14 percent fiber. The physical properties of the unreinforced resins used are set forth below in Table I. Polyvinyl alcohol fibers were added to the resins in varying amounts. The fibers used were 6 denier, 5 mm. long chopped rovings of a fully-hydrolyzed polyvinyl alcohol (fully hydrolyzed before spinning) having a degree of polymerization of about 1,700.

The effect of the addition of polyvinyl alcohol fibers in amounts ranging from 5 to 20 phr upon the various resins is illustrated in Table II.

TABLE II

| Resins | PVA Fiber phr | Izod Impact fpi | $T_f$, °C | $T_4$, °C | HDT °C | MFR g/10 min. |
|---|---|---|---|---|---|---|
| 3 | 20 | 4.2 | 105.0 | 127.5 | 105 | 0.2 |
| 4 | 15 | 4.7 | 100.5 | 121.3 | 96.5 | 0.3 |
| 4 | 10 | 3.1 | 101.7 | 126.2 | 104 | 0.35 |
| 4 | 10 | 3.6 | 100.5 | 121.5 | 98 | 0.6 |
| 4 | 10 | 4.1 | 100.2 | 123.4 | 106 | 0.5 |
| 4 | 5 | 2.7 | 102.4 | 120.2 | 100.5 | 1.3 |
| 1 | 10 | 1.8 | 96.0 | 118.5 | 101.5 | 0.2 |
| 1 | 10 | 3.4 | 97.3 | 120.6 | 100 | 0.2 |
| 2 | 5 | 2.1 | 106.8 | 133.7 | 110 | 0.2 |

From Table II it can be seen that the addition of polyvinyl alcohol fibers provides the improved properties discussed above. The addition of fibers of lengths up to about one-half inch and 8 denier provides similar results as does the addition of fibers having degrees of polymerization ranging from 500 to 3,000. The substitution of a post-chlorinated vinyl chloride homopolymer having an intrinsic viscosity of about 1 dl./g. for the above copolymers will also provide a resin having improved impact resistance.

It can be seen from Table II that the increase in impact strength is proportioned to the amount of PVOH fiber added to the resin. The melt flow of the reinforced resin decreased inversely with the fiber content, but Brabender processability was unaffected, at least at minimal useful fiber concentrations.

It is claimed:

1. Fiber reinforced resins comprising a post-chlorinated vinyl chloride resin selected from the group consisting of homopolymers of vinyl chloride, copolymers of vinyl chloride with propylene and copolymers of vinyl chloride with ethylene, said post-chlorinated vinyl chloride resin containing 60 to 73 weight percent chlorine, and completely hydrolyzed, polyvinyl alcohol fiber of 1 to 10 denier in an amount sufficient to provide about 1 to 30 parts by weight polyvinyl alcohol for each 100 parts of post-chlorinated vinyl chloride resin, the degree of polymerization of the polyvinyl alcohol being about 500 to 3,000 and the fiber being compounded with the post-chlorinated polyvinyl chloride resin at a temperature insufficient to melt the fiber.

2. The resin of claim 1 wherein the fiber is about one-eighth to one-half inch in length.

3. The resin of claim 1 wherein the vinyl chloride resin prior to post-chlorination has an intrinsic viscosity of about 0.4 to 1.2 dl./g.

4. The resin of claim 3 wherein the post-chlorinated polyvinyl chloride resin is a copolymer of vinyl chloride and propylene containing 1 to 10 weight percent propylene.

5. The resin of claim 4 wherein the fiber is about one-eighth to one-half inch in length.

6. The resin of claim 1 wherein the fiber is about 4 to 8 denier and the polyvinyl alcohol has a degree of polymerization of about 1,200 to 2,400.

7. The resin of claim 1 wherein the polyvinyl alcohol is used in an amount of about 3 to 15 parts by weight per 100 parts of resin.

* * * * *